United States Patent
Dussillols et al.

(10) Patent No.: US 9,809,661 B2
(45) Date of Patent: Nov. 7, 2017

(54) PROCESS FOR CONTINUOUS SYNTHESIS OF A DIENE ELASTOMER

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Jerome Dussillols, Clermont-Ferrand (FR); Pierre Kiener, Clermont-Ferrand (FR); Helene Parola, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 204 days.

(21) Appl. No.: 14/411,725

(22) PCT Filed: Jul. 1, 2013

(86) PCT No.: PCT/EP2013/063864
§ 371 (c)(1),
(2) Date: Dec. 29, 2014

(87) PCT Pub. No.: WO2014/006007
PCT Pub. Date: Jan. 9, 2014

(65) Prior Publication Data
US 2015/0158960 A1 Jun. 11, 2015

(30) Foreign Application Priority Data
Jul. 2, 2012 (FR) ..................... 12 56328

(51) Int. Cl.
*C08F 36/04* (2006.01)
*C08F 36/08* (2006.01)
(Continued)

(52) U.S. Cl.
CPC ........... *C08F 36/08* (2013.01); *B01J 19/0066* (2013.01); *B01J 19/18* (2013.01); *C08F 36/04* (2013.01); *B01J 2219/00761* (2013.01)

(58) Field of Classification Search
CPC ...... C08F 2/01; C08F 2/02; C08F 2/60; C08F 36/04; C08F 36/06; C08F 36/08;
(Continued)

(56) References Cited

U.S. PATENT DOCUMENTS 3,389,130 A 6/1968 Pollock
3,458,490 A 7/1969 Howard et al.
(Continued)

FOREIGN PATENT DOCUMENTS

GB 1347088 2/1974

OTHER PUBLICATIONS

Fleury (Bulk Polymerisation or Copolymerisation in a Novel Continuous Kneader Reactor. Macromol. Symp. 2006, 243, pp. 287-298).*

(Continued)

*Primary Examiner* — Brieann R Fink
(74) *Attorney, Agent, or Firm* — Dickinson Wright PLLC

(57) ABSTRACT

A process for the continuous synthesis of diene elastomers with a high degree of conversion is provided. The process includes simultaneously:
a) introducing continuously into a polymerization reactor containing a gas phase and equipped with at least one stirring rotor and a discharge device, at least i. one or more monomers, including at least one conjugated
(Continued)

diene monomer, and ii. from 0% to 70% by mass of an organic solvent, calculated relative to the total mass of monomers and of solvent b) continuously polymerizing the monomer(s),
c) stirring the polymerization medium via the continuous movement of at least one stirring rotor about a rotary axle,
d) continuously discharging the elastomer paste,
e) continuously conveying the discharged elastomer paste to a chopping device and chopping it into particles,
f) removing solvent from the particles of the elastomer paste, and
g) recovering diene elastomer.

21 Claims, 4 Drawing Sheets

(51) Int. Cl.
*C08F 2/01* (2006.01)
*B01J 19/00* (2006.01)
*B01J 19/18* (2006.01)

(58) Field of Classification Search
CPC .... C08F 136/04; C08F 136/06; C08F 236/04; C08F 236/06; C08F 236/08; C08F 236/10
See application file for complete search history.

(56) References Cited

U.S. PATENT DOCUMENTS

| | | | |
|---|---|---|---|
| 3,770,710 A | 11/1973 | Futurama et al. | |
| 5,298,386 A * | 3/1994 | Czekai | G03C 7/388 430/377 |
| 6,897,270 B2 * | 5/2005 | Ozawa | C08F 36/06 526/164 |
| 2009/0192631 A9 * | 7/2009 | Fleury | B01F 5/104 623/55 |

OTHER PUBLICATIONS

LIST (Devolatilization. LIST. 2016, 2 pages).*
International Search Report for PCT/EP2013/06e864 dated Sep. 27, 2013.

* cited by examiner

PROCESS FOR CONTINUOUS SYNTHESIS OF A DIENE ELASTOMER

This application is a 371 national phase entry of PCT/EP2013/063864, filed 1 Jul. 2013, which claims benefit of French Patent Application No. 1256328, filed 2 Jul. 2012, the entire contents of which are incorporated herein by reference for all purposes.

BACKGROUND

1. Field

The present disclosure relates to a process for the bulk synthesis or synthesis in "semi-bulk" concentrated medium of diene elastomers with a high degree of conversion. The disclosure applies especially to the continuous production of diene elastomers.

2. Description of Related Art

During a bulk polymerisation, the reaction medium lacks solvent or diluent. The monomers are then polymerised in the absence of any solvent. The components of the reaction medium in contact are the monomers, the polymer and the constituents of the catalytic system enabling the polymerisation. Polymerisation in "semi-bulk" concentrated medium itself uses only a small amount of solvent when compared with solution polymerisation. It is a polymerisation which proceeds in a solution that is highly concentrated in polymer and weakly concentrated in solvent.

The absence of solvent or of diluent, or alternatively the presence of a reduced amount of solvent or of diluent in the reaction medium has appreciable economic and environmental advantages. The use of solvent or diluent in polymerisation involves the latter being separated from the polymer prepared after the polymerisation step. The extracted solvent or diluent is generally recycled in order to be reused. The cost of the extraction and recycling of the solvent or diluent significantly increases the synthesis cost of the polymer.

Thus, bulk or semi-bulk polymerisation offers many advantages. This type of polymerisation is especially of economic interest, above all as regards the investment costs. Specifically, the size of the items of equipment, in particular those outside the reaction part, is reduced due to the small amount of solvent used.

This reduction of the amount of solvent or diluent also gives access to higher production efficiency of the reactors.

In addition, this reduction or omission of the solvent or diluent entails a decrease in the amount of energy (in the form of vapour for removal of the solvent by steam stripping) to separate the elastomer from the solvent, and also a decrease in the flow of solvent to be treated. All these characteristics lead to a decrease in the energy costs of the polymerisation process.

Moreover, the amount of catalyst is generally reduced, which lowers the cost of the starting materials.

Besides these economic aspects, the reduction of the flow of solvent has an environmental impact since it leads to a reduction of the emission losses and a decrease in energy consumption.

Several processes for the bulk or semi-bulk polymerisation of conjugated dienes have been proposed in the past.

Mention may be made, for example, of patent EP 0 127 236 B1, which describes the bulk polymerisation of butadiene. This is a continuous catalytic polymerisation of butadiene, performed without or with a small proportion of solvent, ranging up to 2% by mass relative to the mass of the monomer. A neodymium-based catalytic system and butadiene feed a polymerisation reactor/extruder. The polymerisation is performed with a monomer content at the reactor/extruder inlet of between 66% and 96% of the total mass of solvent+monomer. In this type of reactor, the variations in residence time are limited. This major drawback does not give access to reactions that require long residence times. Nor does it afford flexibility in the execution of the reaction. In addition, with this type of reactor/extruder, it is difficult to have a constant polymerisation temperature, which may, depending on the catalytic system used, have an impact on the properties of the polymers synthesised, especially their microstructure or their macrostructure.

Another document, patent application WO 2005/087 824, describes a process for the polymerisation of conjugated dienes, which may be performed in continuous or batch mode with less than 50% by mass of solvent. It uses a catalytic system based on lanthanide or cobalt. The polymerisation is performed in a first reactor up to a degree of conversion of not more than 20%. The polymer is discharged and transferred into a second reactor in which devolatilization may be performed.

Limitation to a low degree of conversion of 20% leads to low production efficiency of this process. In addition, the unconverted monomer must be extracted and treated in order to be reintroduced into the first reactor. This treatment takes place on large volumes of unconverted monomer. This aspect of the process makes it sparingly attractive due to its economic and energy impact on the cost of the process.

Limitation to a low degree of conversion of the bulk or semi-bulk polymerisation is also dictated by the appearance of a physical phenomenon that might degrade the nature of the polymer obtained and give rise to uncontrollable situations in an industrial production. Specifically, the vaporization of part of the liquid monomer, due to the effect of the energy of the polymerisation reaction, leads, at and above a certain polymer concentration in the reaction medium, to excessive expansion of the reaction medium. Under such operating conditions, it is no longer possible to control the heat of the reaction and the polymer may thereby be denatured.

Solutions have already been provided in the past to overcome this problem of expansion of the polymerisation medium, especially that of reducing the degree of conversion and of maintaining it below the limit above which the phenomenon is observed at a given temperature.

Thus, U.S. Pat. No. 3,770,710, which is directly aimed at overcoming the expansion phenomenon, proposes a process for the continuous polymerisation of conjugated dienes in two steps. The first step consists of a polymerisation of a liquid butadiene at low temperature, below 50° C., to reach a degree of conversion of between 20% and 40%. The temperature is maintained by controlled evaporation of the liquid phase. The second step consists in continuing the polymerisation and drying of the polymer obtained in a zone separate from the first, especially an extruder, at a higher temperature ranging from 50° C. to 150° C.

Although the expansion phenomenon is avoided, the process described in the said document has drawbacks similar to those of other existing processes, especially a low production efficiency of the process due to a degree of conversion of less than 40%, and also low attractiveness due to the large volumes of unconverted monomer to be manipulated, which leads to a large economic and energy impact.

SUMMARY

In the light of the bulk polymerisation processes of the art, the technical problem that is posed is especially that of being able to provide a process for the synthesis, in highly concentrated medium and in continuous mode, of diene polymers, which also has increased production efficiency, while avoiding the phenomenon of expansion of the reaction medium and allowing flexibility in the execution of the process, especially in a wide temperature range, while at the same time keeping the reaction temperature constant.

Thus, an embodiment of the present invention provides a solution to this problem. Its aim is especially to improve the conditions for the polymerisation of conjugated dienes in highly concentrated medium in order to be able to reach high degrees of conversion, without appearance of the phenomenon of expansion of the reaction medium.

An aim of an embodiment of the invention is also to afford the energy and environmental advantages associated with bulk or semi-bulk polymerisation and the possibility of performing the process in a wide reaction temperature range.

An aim of an embodiment of the invention is also a polymerisation process that may be applied to bulk or semi-bulk polymerisation, which is adaptable to an economically advantageous industrial production with satisfactory production efficiency.

These aims are achieved in that the Inventors have developed a process for the polymerisation of conjugated dienes in highly concentrated media that uses specific reactors and makes it possible to achieve a high degree of conversion that may be up to 100% with mass contents in the monomer feed flow ranging from 30% to 100% of the reaction medium.

Insofar as the process according to an embodiment of the invention proceeds continuously, it should be understood that these steps proceed simultaneously once the reactor is fed.

Thus, a first subject of the invention is a process for the continuous synthesis of a diene elastomer, simultaneously comprising:
  the continuous introduction into a specific reactor containing a gas phase and equipped with at least one stirring rotor and a discharge device, of at least
    one or more monomer(s) to be polymerised, including at least one conjugated diene monomer, and
    where appropriate, an organic solvent
  polymerisation of the monomer(s) into diene elastomer in a stirred polymerisation medium,
  continuous discharge of the elastomer paste derived from the polymerisation,
  chopping of the discharged elastomer paste into particles, and
  removal of the solvent from the particles obtained in the preceding step and
  recovery of the diene elastomer of the particles thus obtained in the preceding step;
  the process being essentially characterized by (1) a high degree of conversion of at least 60%, at the limit of the first third of the reaction volume of the polymerisation reactor and (2) a standard deviation of the residence time distribution function greater than the mean residence time divided by $2\sqrt{3}$.

A subject of the invention is also an installation for performing this process, which is suitable for application at the industrial scale.

In the present description, the expressions "highly concentrated medium" and "bulk or semi-bulk" are used without preference to have the same meaning.

In the present description, the terms "solvent" and "diluent" are used without preference to have the same meaning.

In this description, unless expressly indicated, all the percentages (%) indicated are mass percentages. Moreover, any range of values denoted by the expression "between a and b" represents the range of values running from more than a to less than b (i.e. limits a and b excluded), whereas any range of values denoted by the expression "from a to b" means the range of values running from a to b (i.e. including the strict limits a and b).

The first subject of the invention is a process for the continuous synthesis of a diene elastomer, comprising the following simultaneous steps:
  a) introducing continuously into a polymerisation reactor containing a gas phase and equipped with at least one stirring rotor and a discharge device, at least
    i. one or more monomer(s) to be polymerised, including at least one conjugated diene monomer, and
    ii. from 0% to 70% by mass of an organic solvent, calculated relative to the total mass of monomer(s) and of solvent
  b) continuously polymerising the monomer(s),
  c) stirring the polymerisation medium via the continuous movement of at least one stirring rotor about a rotary axle,
  d) continuously discharging the elastomer paste derived from the polymerisation,
  e) continuously chopping the discharged elastomer paste into particles, and
  f) removing the solvent from the particles of the elastomer paste and
  g) recovering the diene elastomer of particles thus obtained in the preceding step;
  the process being essentially characterized by
    (1) a high degree of conversion, of at least 60%, at the limit of the first third of the reaction volume of the polymerisation reactor and
    (2) a standard deviation of the residence time distribution function in the polymerisation reactor greater than the mean residence time divided by $2\sqrt{3}$.

It should be noted that this combination of the flow characteristics and of the conversion constitutes an essential element of the invention which allows the continuous polymerisation process to respond to the posed technical problem for polymerisation in highly concentrated medium, adaptable to an economically advantageous industrial production with satisfactory production efficiency.

Insofar as the process according to an embodiment of the invention proceeds continuously, it should be understood that these steps proceed simultaneously once the reactor has been fed.

According to a particular embodiment of the synthetic process of the invention, the polymerisation is performed continuously with an amount of solvent or diluent not exceeding 70% by mass of the total mass of monomer(s) and of solvent, the amount of solvent possibly being, for example, at least 10% by mass, or even at least 30% by mass, and not more than 60% by mass, or even not more than 55% by mass of the total mass of monomer(s) and of solvent.

According to another embodiment of the invention, the polymerisation is performed without addition of polymerisation solvent.

The choice of the polymerisation reactor constitutes, as a result of these implementation possibilities, a particularly important aspect of the process according to the invention. Specifically, it is desired to polymerise monomers in highly concentrated media. According to the invention, the term "highly concentrated media" should be understood as meaning a concentration of monomer(s) in the solvent+monomer (s) mixture of at least 30% by mass, this concentration possibly being up to 100% by mass in the absence of solvent. In addition, it is desired to polymerise until high degrees of conversion at the limit of the first third of the reaction volume of the polymerisation reactor are obtained, of at least 60% and which may be up to 100%.

The viscosity of the polymerisation medium consisting essentially of the monomers, the elastomer and, where appropriate, the solvent, may reach high values. The inherent viscosity of the diene elastomer depends on its nature. It has a minimum value of at least 1.5 dl/g or even of at least 4 dl/g, especially for the polyisoprenes obtained via coordination catalysis. However, the inherent viscosity preferably does not exceed 10 dl/g or even 7 dl/g. The inherent viscosity is determined according to the method described in Appendix 1.

The stirring in the polymerisation reactor must ensure the blending of this very viscous medium to allow the synthesis of a polymer of constant and homogeneous quality.

Besides the compatibility with high viscosities, the reactor must be suitable for use for polymerising the monomer(s) in a continuous mode.

The polymerisation reactor according to an embodiment of the invention is defined as containing a gas phase and being equipped with at least one stirring rotor and a discharge device, and also at least one inlet and one outlet.

The stirring rotor allows continuous stirring of the reaction medium. It may be of varied form and is suited to the technology of the reactor. Several types may be found commercially. By way of example, the stirring rotor may be a blade of sigma type (or Z-shaped) or blades of another type as described in the book by David B. Todd, Mixing of Highly Viscous Fluids, *Polymers, and Pastes*, in *Handbook of Industrial Mixing: Science and Practice*, E. L. Paul, V. A. Atiemo-Obeng, and S. M. Kresta, Editors. 2004, John Wiley and Sons. Page 998, page 1021.

When the reactor is equipped with at least two stirring rotors, they may be co-rotating or counter-rotating rotors. They may also be of tangential or nested type.

According to certain configurations, the polymerisation reactor is equipped with a stirring rotor. Thus, this type of reactor may be formed from a tank, a stirring rotor and a discharge device. For example, mention may be made of the reactor sold by the company List AG under the name single-arm kneader.

According to other configurations, the polymerisation reactor is equipped with two stirring rotors.

According to the configurations described above, the polymerisation reactor may be formed from a tank, its stirring system and a discharge device.

According to preferred configurations, the polymerisation reactor is more particularly of Z-shaped arm blender technology. The term "Z-shaped arm blender technology" more particularly means a mixer or blender formed from a tank equipped with two Z-shaped arms, each optionally driven independently about a rotary axle, which is preferably horizontal. The two Z-shaped arms are then preferentially driven counter-rotatively so as to force-feed the emptying device at the bottom of the tank.

By way of example, a suitable reactor is sold under various names such as:
the sigma blade mixer-discharge screw type blenders sold by the company Battaggion SPA,
the extrusion-kneaders sold by the company Aachener Misch- and Knetmaschinenfabrik Peter Küpper GmbH & Co. KG,
the double-Z-kneaders with extension screw sold by the company Hermann Linden Maschinenfabrik GmbH & Co. KG.,
the mixer extruders sold by the company Aaron Process Equipment Company.

The polymerisation reactor contains a gas phase allowing the evacuation of the polymerisation heat by vaporization of part of the reaction medium. The volume ratio of the gas phase to the reaction medium depends on the type of reactor used and its determination is within the scope of a person skilled in the art.

According to one embodiment of the invention, the polymerisation is performed in bulk. In this case, there is no addition of polymerisation solvent.

According to other embodiments of the invention, the polymerisation is performed in semi-bulk. The medium then comprises an inert hydrocarbon-based polymerisation solvent, which is preferably aliphatic or alicyclic of low molecular mass, especially for environmental reasons. Examples that may be mentioned include n-pentane, isopentane, isoamylenes (2-methyl-2-butene, 2-methyl-1-butene and 3-methyl-1-butene), 2,2-dimethylbutane, 2,2-dimethylpropane (neopentane), n-heptane, n-octane, isooctane, cyclopentane, cyclohexane, n-hexane, methylcyclopentane and methylcyclohexane, and also mixtures of these compounds, n-pentane being particularly preferred. Mention may also be made, as solvent, of aromatic hydrocarbons, for instance benzene or toluene.

The solvent may be introduced directly into the reactor. It may also be premixed with at least one other of the components introduced into the polymerisation reactor, especially with the monomer(s) to be polymerised. This last option constitutes a preferential implementation according to the invention.

According to the process of an embodiment of the invention, at least one conjugated diene monomer is polymerised. The term "conjugated diene monomer" means a conjugated diene monomer containing from 4 to 16 carbon atoms. Conjugated dienes that are especially suitable for use include 1,3-butadiene, 2-methyl-1,3-butadiene, 2,3-di($C_1$ to $C_5$ alkyl)-1,3-butadiene, for instance 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, myrcene, etc.

According to embodiments of the process of the invention, the conjugated diene monomer may be copolymerised with one or more conjugated diene monomers. According to other embodiments of the process of the invention, when the type of polymerisation allows it, the conjugated diene monomer may be copolymerised with one or more compounds such as vinylaromatics containing from 8 to 20 carbon atoms. According to yet other embodiments, when the type of polymerisation allows it, the conjugated diene monomer may be copolymerised with one or more conjugated diene monomers and with one or more vinylaromatics containing from 8 to 20 carbon atoms.

Vinylaromatic compounds that are especially suitable for use include styrene, ortho-, meta- or para-methylstyrene, the commercial "vinyltoluene" mixture, para-tert-butylstyrene, methoxystyrenes, vinylmesitylene, divinylbenzene, vinylnaphthalene, etc.

According to one embodiment of the process of the invention, the conjugated diene monomer may be introduced in the form of a petroleum fraction comprising the monomer (s) to be polymerised. Thus, for example, when it is desired to polymerise isoprene, it may be introduced into the polymerisation reactor in the form of a C5 petroleum fraction.

The choice of monomers is dictated by the type of polymerisation envisaged and the desired polymer. According to embodiments, the process of polymerisation in highly concentrated medium of the invention may apply to anionic polymerisation initiated, for example, by means of an organic compound of an alkali metal or alkaline-earth metal. According to other embodiments of the process of the invention, it may apply to chain polymerisation by catalysis (according to the coordination-insertion mechanism), by means of a catalytic system based on a rare-earth metal, titanium or another transition metal.

In the context of an anionic polymerisation, the polymerisation initiator may be any known monofunctional or polyfunctional anionic initiator. However, an initiator containing an alkali metal such as lithium or an alkaline-earth metal such as barium is preferentially used. Organolithium initiators that are suitable for use especially include those comprising one or more carbon-lithium bonds such as n-butyllithium (n-BuLi) or lithium amides. Representative compounds containing barium that may be used in the context of the present invention are those described, for example, in patent applications FR-A-2 302 311 and FR-A-2 273 822 and the certificates of addition FR-A-2 338 953 and FR-A-2 340 958. Such anionic polymerisation initiators are known to those skilled in the art. In the context of a chain polymerisation by coordination catalysis, a catalytic system based on a rare-earth metal or titanium is used.

Such catalytic systems are widely described in the literature.

By way of example, such a catalytic system may be prepared based on at least:
an organic rare-earth metal salt,
an alkylating agent, and
where appropriate,
a halogen donor and/or
a preformation conjugated diene monomer.

The term "based on" used to define the constituents of the catalytic system means the product(s) of reaction of these constituents after premixing of all or part of the constituents, or, where appropriate, after preformation and/or maturing of the catalytic system or alternatively the product(s) of the in situ reaction of these constituents.

The catalytic system may be prepared in batch or continuous mode. According to one embodiment of the process of the invention, upstream of the polymerisation reactor, an installation for the continuous synthesis of the catalytic system continuously feeds the polymerisation reactor. The catalytic system may be introduced directly into the reactor or may be premixed with at least one of the other components that feed the polymerisation reactor.

According to embodiments of the invention, the term "rare-earth metal" means a metal chosen from yttrium, scandium and lanthanides, metals having an atomic number ranging from 57 to 71 inclusive in the Mendeleev Periodic Table of the Elements. Preferably, the rare-earth metal is chosen from lanthanides, neodymium being more particularly preferred.

The term "organic salt of a rare-earth metal" means, for example, rare-earth metal tris(carboxylates), tris(alcoholates), tris(acetylacetonates) or tris(organophosphates).

When the organic salt of a rare-earth metal is a rare-earth metal tris(carboxylate), the carboxylate may be chosen from linear or branched aliphatic carboxylic acid esters, containing 6 to 16 carbon atoms in the linear chain, and aromatic carboxylic acid esters comprising between 6 and 12 substituted or unsubstituted carbon atoms. Examples that may be mentioned include neodecanoate (versatate), octoate, hexanoate (which may be linear or branched, or alternatively naphthenate, which may be substituted or unsubstituted. Among these, a rare-earth metal 2-ethylhexanoate, naphthenate or neodecanoate (versatate) is particularly preferred.

When the organic salt of a rare-earth metal is a rare-earth metal tris(alcoholate), the alcoholate may be chosen from alcoholates of an alcohol or a polyol derived from an aliphatic or cyclic hydrocarbon and especially from a linear or branched aliphatic hydrocarbon containing 1 to 10 carbon atoms in the linear chain, more particularly 4 to 8 carbon atoms. An example that may be mentioned is neopentanolate.

When the organic salt of a rare-earth metal is a rare-earth metal tris(organophosphate), the organophosphate may be chosen from the phosphoric acid diesters of general formula (R'O)(R"O)PO(OH), in which R' and R", which may be identical or different, represent an alkyl, aryl or alkylaryl radical. By way of example, mention may be made of the use of neodymium tris[dibutyl phosphate], neodymium tris[dipentyl phosphate], neodymium tris[dioctyl phosphate], neodymium tris[bis(2-ethylhexyl)phosphate], neodymium tris [bis(1-methylheptyl)phosphate], neodymium tris[bis(p-nonylphenyl)phosphate], neodymium tris[butyl(2-ethylhexyl)phosphate], neodymium tris[(1-methylheptyl)-(2-ethylhexyl)phosphate], neodymium tris[(2-ethylhexyl) (p-nonylphenyl)phosphate], neodymium tris[bis(2-ethylhexyl)phosphate], tris[bis(oleyl)phosphate] or tris[bis(lineolyl)phosphate].

Among the rare-earth metal organophosphates, the salt is even more preferentially a rare-earth metal bis(2-ethylhexyl) phosphate.

The rare-earth metal organic salt is preferentially chosen from neodymium tris[bis(2-ethylhexyl)phosphate] and neodymium tris(versatate).

The rare-earth metal salt is dissolved or suspended conventionally according to the case in an inert hydrocarbon-based solvent chosen, for example, from aliphatic or alicyclic solvents of low molecular weight such as cyclohexane, methylcyclohexane, n-heptane, or a mixture of these solvents.

As alkylating agents that may be used in the catalytic system according to an embodiment of the invention, mention may be made of alkylaluminiums chosen from trialkylaluminiums, or dialkylaluminium hydrides, the alkyl group comprising from 1 to 10 carbon atoms. Tri(alkylaluminiums) that may be mentioned include triethylaluminium, triisopropylaluminium, triisobutylaluminium, tributylaluminium and trioctylaluminium. Among the alkylaluminiums, triisobutylaluminium or diisobutylaluminium hydride is preferred.

As alkylating agents that may be used in the catalytic system according to an embodiment of the invention, mention may also be made of aluminoxanes, which are compounds derived from the partial hydrolysis of one or more trialkylaluminiums, such as methylaluminoxane, triisobutylaluminoxane or methylaluminoxanes.

When the catalytic system comprises a halogen donor, use may be made of an alkyl halide, an alkylaluminium halide or an alkylaluminium sesquihalide. Use is preferentially made of an alkylaluminium halide, the alkyl group comprising from 1 to 8 carbon atoms. Among these, diethylaluminium chloride is preferred.

According to one embodiment, to make the catalytic system, a combination of diisobutylaluminium hydride and diethylaluminium chloride as alkylating agent and as halogen donor, respectively, is used in combination.

According to a particular characteristic of the catalytic system, the rare-earth metal(s) are present in the catalytic system in a concentration greater than or equal to 0.002 mol/l, preferably ranging from 0.002 to 0.1 mol/l and more particularly ranging from 0.010 mol/l to 0.08 mol/l, or even ranging from 0.02 to 0.07 mol/l.

According to another particular characteristic of the catalytic system, the (alkylating agent/rare-earth metal salt) mole ratio in the said catalytic system has a value of at least 1/1 and of not more than 20/1, and even more advantageously of not more than 5/1.

According to yet another particular characteristic of the catalytic system, the (halogen donor/rare-earth metal salt) mole ratio may have a value of at least 2/1 and preferably of at least 2.6/1, and of not more than 3.5/1 and preferably not more than 3/1.

When the catalytic system comprises a preformation conjugated diene monomer used to "preform" the said catalytic system, it may be chosen from the conjugated diene monomers mentioned previously. 1,3-Butadiene or isoprene are particularly preferred.

It will be noted that the (preformation monomer/rare-earth metal salt) mole ratio may have a value ranging from 10/1 to 70/1 and preferably from 25/1 to 50/1.

As preformed or non-preformed catalytic system, use may be made in the context of the present invention of those described in documents WO-A-02/38636, WO-A-03/097708 and WO-A-2007/045 417 in the name of the Applicants.

According to execution variants of the catalytic polymerisation process in accordance with the invention, it is possible to introduce into the polymerisation reactor, via a stream independent from the introduction of the catalytic system used for the polymerisation reaction, a predetermined additional amount of at least one alkylaluminium compound of formula $AlR_3$ or $HalR_2$ or $R''_n AlR'_{3-n}$, in which R and R' represent a saturated or unsaturated alkyl group of 1 to 20 carbon atoms and preferentially of 1 to 12 carbon atoms, R'' represents an allylic group, n is an integer inclusively from 1 to 3. This alkylaluminium compound may be identical to or different from that of the catalytic system. Such variants are described especially in documents WO 2006/133 757, EP 1 845 118, WO 10/069 511, and WO 10/069 805.

According to one embodiment of the polymerisation process of the invention, all the components of the initial reaction medium, i.e. the monomers to be polymerised, the optional solvent, the polymerisation initiator or the catalytic system and, where appropriate, the additional alkylaluminium, may be introduced individually directly into the polymerisation reactor.

According to other embodiments of the process of the invention, at least two components of the initial reaction medium are not introduced individually directly into the polymerisation reactor. Mixing of the said components may be ensured by various means known to those skilled in the art with static or dynamic mixers or ultrasonic mixers. The mixture may be temperature-conditioned before entering the polymerisation reactor.

A second step of the process according to the invention concerns the polymerisation of the diene monomers until a high degree of conversion is reached (1) of at least 60%, at the limit of the first third of the reaction volume of the polymerisation reactor with (2) a standard deviation of the residence time distribution function in the polymerisation reactor greater than the mean residence time divided by $2\sqrt{3}$.

According to an embodiment of the process of the invention, the degree of conversion of the monomers into polymer is at least 60%, at the limit of the first third of the reaction volume of the polymerisation reactor. The term "volume of the polymerisation reactor" means the volume existing in the reactor between the reagent inlet point and the reactor outlet, excluding the discharge device.

This limit degree of conversion of 60%, associated with the specific characteristic relating to the residence time distribution function of an embodiment of the invention, is essential for overcoming the formation of foam and eliminating the phenomenon of expansion of the reaction medium. Specifically, below 60% and without satisfying the condition relating to the residence time distribution function of an embodiment of the invention, the formation of bubbles is observed, which rapidly leads to an uncontrollable expansion of the reaction medium. To achieve this necessary degree of conversion of at least 60%, a person skilled in the art has numerous technical means or levers that he can vary in a multitude of combinations. Among these various technical levers, mention may be made of the reaction temperature, the monomer concentration in the reaction medium, the catalyst or polymerisation initiator concentration in the reaction medium, the mean residence time, etc. The means to be used to achieve at least 60% conversion at the limit of the first third of the reaction volume of the polymerisation reactor are within the scope of a person skilled in the art. The simple instruction of achieving a minimum conversion limit, in the present case at least 60% at the limit of the first third of the reaction volume of the polymerisation reactor, constitutes for him an identification of the combinations of means to be used in order to execute this instruction.

The degree of conversion may be determined in various ways, known to a person skilled in the art. For example, the degree of conversion may be determined from a measurement taken on a sample withdrawn at the limit of the first third of the reaction volume of the polymerisation reactor, for example by gas chromatography (GC). The concentration of residual monomer(s) (not converted in the sample) is measured. By difference between the concentration of the monomer(s) introduced into the polymerisation reactor ($C_i$) and the concentration of residual monomer(s) measured in the sample withdrawn ($C_r$), the degree of conversion is determined as a mass percentage as being:

$$X \% \text{ mass} = 100 * \left[ \frac{(C_i - C_r)}{C_i} \right]$$

with:

X % mass: degree of conversion as a mass percentage;

$C_i$: concentration of the monomer(s) introduced into the polymerisation reactor;

$C_r$: concentration of the residual monomer(s) measured in the sample withdrawn.

Preferentially, this degree of conversion is at least 80% and even more preferentially from 85% to 100%, for increasing production efficiency.

The process of an embodiment of the invention is also characterized by the flow conditions in the reactor during the polymerisation reaction. Characterization of these flows by a residence time distribution function is such that the standard deviation of the residence time distribution function is greater than the mean residence time divided by $2\sqrt{3}$. More particularly, the standard deviation of the residence time distribution function is greater than the mean residence time divided by 2. The residence time distribution function in the polymerisation reactor may be determined in a manner that is known per se to a person skilled in the art. For example, it may be determined by modelling experimental points obtained by gas chromatographic measurement of the evolutions of concentration of a tracer at the reactor outlet, following a very rapid injection of this tracer, according to a method of impulse introduction of a chemically inert product according to the principle described in the book *Jacques Villermaux, Génie de la eaction chimique: conception et fonctionnement des reacteurs. Editors.* 1993, TEC & DOC—LAVOISIER, pages 170 to 172.

The combination of these two characteristics of degree of conversion and flow constitutes an essential element of embodiments of the invention. A process for the synthesis, in highly concentrated medium and continuously, of diene polymers having increased production efficiency and noteworthy flexibility is thus provided according to the invention.

The heat of the polymerisation reaction is mainly regulated by the at least partial vaporization of the constituents of the non-polymeric phase of the reaction medium. The regulation of the heat of the polymerisation reaction by vaporization of part of the constituents of the non-polymeric phase of the reaction medium involves a free space (permanent or temporary) above the said medium that is capable of receiving the gas phase as has been defined previously. To control the reactor temperature and thus govern the removal of the heat released by the polymerisation reaction, several configurations may be envisaged.

Thus, according to one variant, an internal condenser may be installed in the gas phase of the reactor.

According to another variant, an external condensation loop is used. According to this variant, a part of the gas phase generated by the vaporization of the reaction medium during the polymerisation is entrained via an outlet of the reactor to a condenser. The condensate may then be advantageously totally or partially reinjected into the reactor as a replacement for part of the solvent and/or monomers in the mixture of at least one monomer and solvent, or may be stored for subsequent use. In the latter case, the flows entering or leaving the polymerisation reactor should then be adjusted so as to keep the reaction volume or the residence time in the reactor constant. A device may be installed to remove the uncondensable matter either from the reactor or from the condensation loop depending on the variants used for controlling the heat of the reaction.

According to yet another variant, the heat of the polymerisation reactor may also be partially controlled by cooling provided by the initial components injected into the polymerisation reactor when the temperature of the said components is at a lower temperature than the reaction medium. The initial components injected into the polymerisation reactor may thus be regulated to the desired temperature between −5° C. and room temperature.

According to other variants, the heat of the polymerisation reaction may also be partially controlled by cooling via the jackets or the stirring arms of the reactors.

These different variants may be combined together, bearing in mind that since the process proceeds continuously, the combined variants proceed simultaneously. The variant of the external condensation loop will at least be preferred, since the exchange surface is not limited by the available space inside the reactor.

The polymerisation is performed in the reactor under conditions of thermodynamic equilibrium between the polymerisation medium and the gas phase. Thus, according to a particular embodiment of the process of the invention, regulation of the pressure of the gas phase in the reactor, which is more reactive than regulation of the temperature, may advantageously be installed and may make it possible to keep the reaction medium at a chosen pressure and thus, due to the thermodynamic equilibrium, at a chosen temperature.

According to one embodiment of the process of the invention, the polymerisation reaction may also be performed under vacuum, in which case a connection to a vacuum circuit may be provided, preferably on the external condensation loop.

The very low absolute pressure values allow polymerisation at very low temperature, these operating conditions being especially favourable to the synthesis of certain diene elastomers.

Conventionally, the polymerisation takes place at a temperature within the range from −30° C. to 100° C.

During the monomer polymerisation step, the reaction medium, which may reach a high viscosity, is kept stirring by the movement around a rotary axle, which is preferably horizontal, of the polymerisation reactor stirring rotor(s).

Another step of an embodiment of the invention consists in continually discharging part of the reaction medium in the form of an elastomer paste comprising the synthesized elastomer. This continuous discharge is performed via a discharge device that is totally or partially integrated into the polymerisation reactor, such as a withdrawal device with gears or screws, located at the bottom or on the side of the reactor. To govern the reactor outlet flow, the additional devices may be installed at the reactor outlet. Thus, according to a particular variant of the invention, the elastomer paste is discharged by the combined action of at least one emptying screw and a gear pump, which together constitute the discharge system, by force-feeding the gears with the elastomer paste discharged by the screw device. It is thus advantageously possible to maintain a reactor outlet flow rate equivalent to a reactor inlet flow rate so as to ensure continuous functioning at constant residence time.

When the discharge device comprises a screw, it may be a single or twin screw.

At this stage and according to a variant of the invention, the process for synthesizing a diene elastomer may be continued in a manner that is known per se. Thus, according to one embodiment, the polymerisation may be stopped, optionally after a step of modification of the diene elastomer.

Another step of the process of the invention consists in chopping the discharged elastomer paste. The elastomer paste is conveyed to a device for chopping it. This type of device is preferentially a granulator which allows the paste to be transformed into particles of variable shapes and with mean volumes of between 0.07 $cm^3$ and 12 $cm^3$.

The granulation step may be performed under various conditions known to those skilled in the art and which are suitable for performing the process according to the invention. Thus, for example, the granulation may be performed under water making it possible to feed a step for removal of the solvent from the particles of the elastomer paste by steam stripping, or alternatively in a gas phase making it possible to feed a step for removal of the solvent from the particles of the elastomer paste by drying different from steam stripping. According to a preferential aspect, the granulation will be performed under water. By way of example, this type of granulator under water is sold under various names such as the Underwater Pelletizers sold by the company Gala Industries, or the Underwater Pelletizing from the company Kreyenborg Industries.

The process then continues in a manner that is known per se by separation and recovery of the prepared diene elastomer. The unreacted monomers and/or the solvent contained in the elastomer paste, in the form of particles, may be removed according to methods known to those skilled in the art.

The elastomer recovered after these various steps may then be conditioned in a manner known per se, for example in the form of balls.

According to one variant of the invention, which constitutes a particularly preferred variant, before the chopping step e), the elastomer solution discharged in step d) is transferred continuously (step $d_1$)) to a blender containing a gas phase, at least one stirring rotor and a discharge device, to undergo therein an additional treatment of physical or chemical nature (step $d_2$)).

This blender is advantageously self-cleaning According to the invention, the term "self-cleaning" means that its stirring system sweeps at least 90% of the volume of the blender, preferentially 95% of the volume. Among the blenders that may be envisaged, mention may be made of the reactors of continuous blending technology equipped with a discharge device containing at least one screw and especially continuous blenders stirred with twin-screw discharge. Such blenders are sold, for example, by the company List AG under the name twin-arm kneader reactor or by the company Buss-SMS-Canzler under the name twin-arm horizontal large-volume processors.

The blender may have various roles to perform various steps subsequent to the polymerisation.

Thus, according to a first embodiment of this variant of the invention, in the case where the degree of conversion of 100% has not been reached in the polymerisation reactor, the polymerisation may be continued in this second reactor under conditions similar to those of the first reactor until a degree of conversion higher than that reached in the first reactor is reached, preferably a degree of conversion ranging from 96% to 100%. To govern the heat of the end of the polymerisation reaction, the same variants as for the polymerisation reactor may be envisaged, while at the same time being adapted to the technological design of the reactor. A condensation loop may especially be used. When a condensation loop is used, it functions in the same manner as that of the polymerisation reactor described above. The stream of condensate may be totally or partly reinjected into the blender, or reintroduced upstream of the first reactor, in partial replacement for the solvent and/or the monomers in the mixture of at least one monomer and of solvent, or alternatively may be stored for subsequent use. These various options may be combined together.

According to another embodiment of this variant of the invention, the blender may also be used to concentrate the reaction medium by removing, where appropriate, part of the solvent, and/or of the unreacted monomers. This step is known as the concentration step. A condensation loop is then used. This loop functions in the same manner as that of the polymerisation reactor described above. The stream of condensate is then not reinjected into the blender, but may advantageously be reintroduced totally or partly upstream of the first reactor, as replacement for part of the solvent and/or of the monomers in the mixture of at least one monomer and of solvent, or may be stored for subsequent use.

According to another embodiment of this variant of the invention, the blender may also be used to devolatilize the reaction medium by removing, where appropriate, the solvent, and/or the unreacted monomers. A condensation loop is then used. This loop functions in the same manner as that of the polymerisation reactor described above. The stream of condensate is then not reinjected into the blender, but may advantageously be reintroduced totally or partly upstream of the first reactor, in replacement for part of the solvent and/or of the monomers in the mixture of at least one monomer and of solvent, or may be stored for subsequent use.

According to another embodiment of this variant of the invention, reactions subsequent to the polymerisation may be performed in this blender by addition of suitable agents. It may be envisaged to add an agent for stopping the polymerisation, antioxidant additives, agents for modifying the macrostructure of the elastomer, etc. This other embodiment may be combined with the preceding ones.

These various embodiments may be combined together. It is understood that, insofar as it is a continuous process, these various steps, when they are combined, are performed simultaneously. For example, the blender may be used to continue the polymerisation while at the same time concentrating the reaction medium.

The elastomer paste derived from this additional treatment step is continuously discharged from this blender (step $d_3$)). This continuous discharging is performed by a device with which the blender is equipped. Additional devices for transporting the products may be installed at the outlet of the reactor discharge device to govern the outlet flow rate. Thus, according to a particular variant of the invention, the reactor is discharged by the combined action of at least one emptying screw and of a gear pump which together constitute the discharge system, by force-feeding the gears with the elastomer paste discharged by the screw device.

At this stage, the process may be continued in a manner known per se. Thus, depending on the additional treatment undergone, the polymerisation may be stopped or additives may be added to the elastomer paste exiting the blender.

The elastomer paste is then conveyed to the chopping device of step e) and the process of the invention is continued.

A subject of the invention is also any installation for performing the process for the continuous synthesis of a diene elastomer, which is suitable for application at the industrial scale.

BRIEF DESCRIPTION OF DRAWINGS

As non-limiting illustrations, two installations for the continuous synthesis of a diene elastomer in accordance with two embodiments of the synthetic process of the invention are more particularly described with reference to FIGS. 1 and 2, each constituting a schematic representation of an installation.

DETAILED DESCRIPTION OF SPECIFIC EMBODIMENTS

Figure 1:
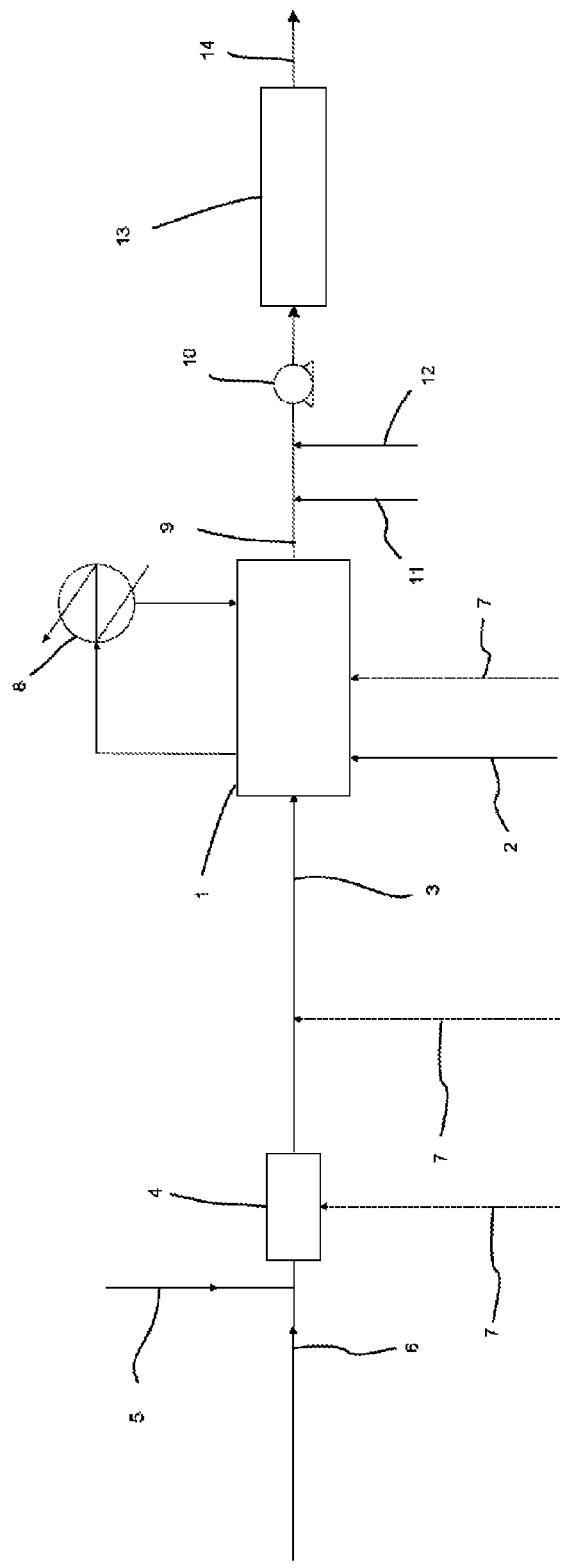
FIG. 1 is a scheme of an installation according to one embodiment of the invention for the continuous synthesis of a diene elastomer by coordination catalysis incorporating a polymerisation reactor and a granulator.

The installation illustrated in FIG. 1 essentially comprises a polymerisation reactor 1 which contains a gas phase and is equipped with at least one stirring rotor and a discharge device containing at least one screw. The reactor 1 is equipped with means for reaching, in concentrated medium, a specific flow such that the residence time distribution function is such that the standard deviation of this function is greater than the mean residence time divided by $2\sqrt{3}$, preferably greater than the mean residence time divided by 2.

The reactor 1 is thus equipped with a stirring system suited to the high viscosities that the reaction medium may reach. Specifically, the synthetic process of the invention is also adapted to bulk polymerisation. This particular variant of the invention allows a person skilled in the art to estimate the type of stirring to provide. Stirring systems that may be envisaged are described above.

According to preferred configurations, the polymerisation reactor is more particularly of Z-shaped arm blender technology (or sigma blender). The term "Z-shaped arm blender technology" more particularly means a mixer or blender formed from a tank equipped with two Z-shaped arms, each driven about a rotary axle that is preferably horizontal. Each of the arms is supported on both of the two opposite sides of the tank. When the arms are imbricated, they are driven in rotation with fixed speed ratios, so that they do not hit each other. When the arms are tangential, they are driven in rotation independently of each other, or otherwise. The two Z-shaped arms are preferentially driven counter-rotatively so as to force-feed the emptying device at the bottom of the tank.

The polymerisation reactor 1 is at least connected to
several continuous feed sources including at least one source 2 for feeding with catalytic system, a source 3 for feeding with at least one monomer, where appropriate mixed with the inert hydrocarbon-based solvent, and
an outlet adapted to remove from the said reactor 1, continuously, the elastomer paste as a stream leaving via a discharge device.

According to the variant of the installation illustrated by FIG. 1, the polymerisation reactor 1 is connected to a source 3 for feeding with a mixture of at least one monomer and of solvent. A mixer 4, located upstream of the polymerisation reactor 1, performs this mixing. This mixer 4 is fed with a source of at least one monomer 5 and with a source of solvent 6, and is connected to the polymerisation reactor 1.

According to variants of the catalytic polymerisation process in accordance with the invention, a predetermined additional amount of at least one alkylaluminium compound may be introduced into the polymerisation reactor, via a stream that is separate and independent from the introduction of the catalytic system used for the polymerisation reaction. According to an installation variant illustrated by dashed lines in FIG. 1, the polymerisation reactor 1 is also connected to a source for feeding with additional alkylating agent 7. The alkylating agent may, alternatively, be added to the mixture of monomer and solvent before the inlet into the reactor 1, the source for feeding with additional alkylating agent 7 thus being connected to the source for feeding with monomer and solvent 3, as is indicated with dashed lines in FIG. 1. Alternatively, according to another alternative that is also illustrated in FIG. 1 by dashed lines, the alkylating agent may be injected directly into the mixer 4 in order to be mixed therein with the monomer and the solvent, the source for feeding with additional alkylating agent 7 then being connected to the mixer 4.

According to an installation variant illustrated in FIG. 1, the source for feeding with catalytic system 2 may be connected to an installation, not shown, for the continuous preparation of the catalytic system as described in EP 1 968 734 A1

The polymerisation reactor 1 is equipped with a discharge device containing at least one screw which makes it possible to continuously discharge the elastomer paste as an exiting stream 9. This discharge device consists of at least one emptying screw, integrated into the reactor 1, and of a gear pump 10 downstream of the reactor 1. The discharge device is particularly adapted to continuously discharge a product of high viscosity, and thus makes it possible to regulate the flow rate leaving the reactor 1 so that it is identical to the flow rate entering this same reactor 1. The discharge device that may be envisaged is more fully described above.

The presence of a gas phase in the reactor 1, the stirring system adapted to high viscosities and the continuous discharge device constitute, with the various feeds of monomers, solvent and catalytic systems, essential means for being able to perform the process for the continuous synthesis of a diene elastomer especially characterized by a degree of conversion of at least 60%, at the limit of the first third of the reaction volume of the polymerisation reactor in combination with a specific flow such that the standard deviation of the residence time distribution function in the polymerisation reactor is greater than the mean residence time divided by $2\sqrt{3}$.

According to certain embodiments of the polymerisation process, the heat of the polymerisation reaction is regulated by the at least partial vaporization of the non-polymeric constituents of the reaction medium. In FIG. 1 illustrating a variant of this process, the polymerisation reactor 1 is equipped with a condensation loop which allows
the condensation of the gases derived from the reactor 1 via a condenser 8, and
the return of all or part of the condensate into the reactor 1.

According to an optional embodiment, not shown, the condensation loop may advantageously be connected to a device for removing the uncondensable products, in a manner known per se.

According to the embodiment of the invention illustrated in FIG. 1, a stopper and an antioxidant are then injected into the stream of elastomer paste 9 discharged from the reactor 1, by means, respectively, of feed sources 11 and 12 upstream of the gear pump 10.

The installation illustrated in FIG. 1 also comprises a granulator 13, preferably under water. The granulator 13 is equipped with an inlet connected to the gear pump 10 via which the discharge device feeds the granulator 13 with elastomer paste to be chopped. The granulator 13 is also equipped with an outlet adapted to remove from the said granulator 13, continuously, the particles of elastomer paste as a stream 14 especially towards a device for removing the solvent and the monomer(s).

Figure 2:
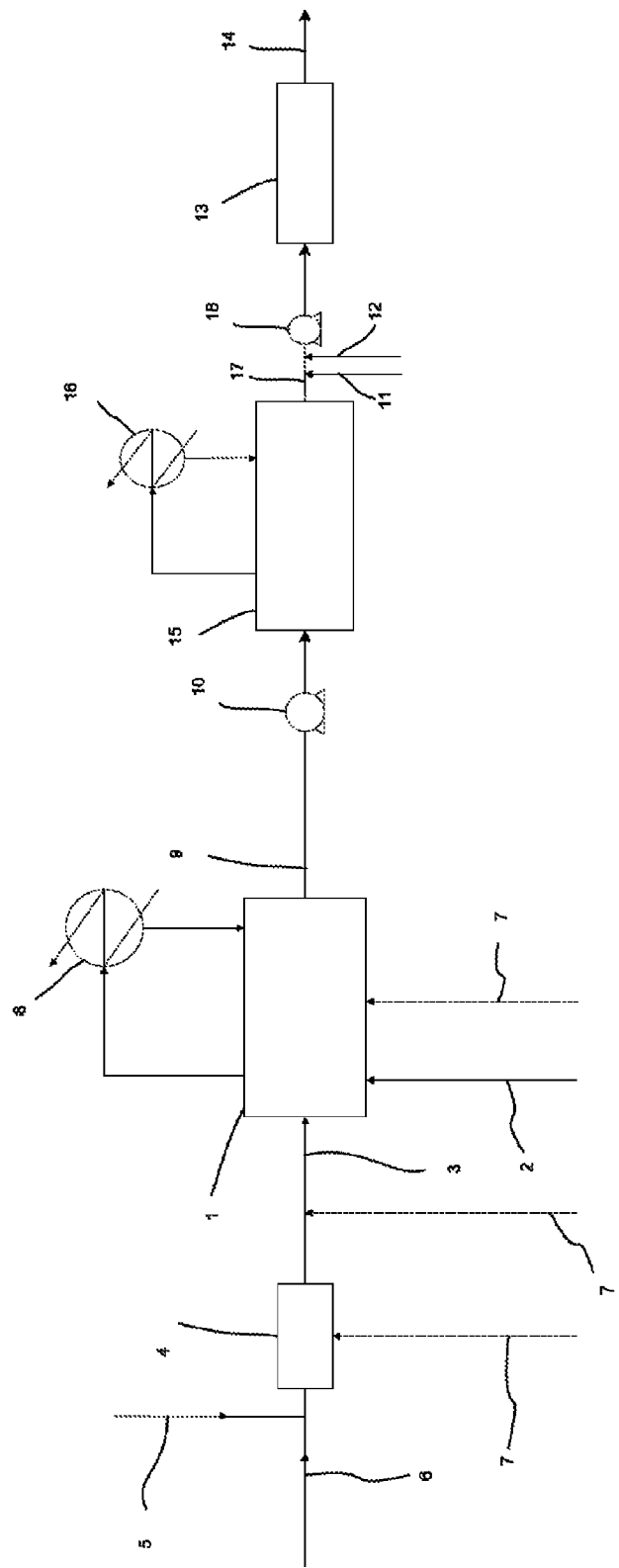
FIG. 2 is a scheme of an installation according to an embodiment of the invention for the continuous synthesis of a diene elastomer by coordination catalysis incorporating, besides a polymerisation reactor and a granulator, a self-cleaning blender.

The installation illustrated in FIG. 2 comprises the same elements upstream of the polymerisation reactor 1 as those represented in FIG. 1, up to the polymerisation reactor 1. It also comprises a blender 15 downstream of the polymerisation reactor 1 and connected thereto via the gear pump 10. The blender 15 has a stirring device which sweeps at least 90% of the volume of the blender and preferentially 95% of its volume, thus ensuring self-cleaning.

The blender 15 is at least equipped with
an inlet connected to a source for feeding with elastomer paste discharged from the polymerisation reactor 1 via the gear pump 10, an outlet adapted to remove from the said blender 15, continuously, the elastomer paste as an exiting stream 17 towards the pump 18.

The blender 15 is equipped with a discharge device containing at least screw which allows the continuous discharge of the elastomer paste as an exiting stream 17. This discharge device consists of at least one emptying screw, integrated into the blender 15, and a gear pump 18 located downstream of the reactor 15.

The exiting stream of elastomer paste 17 is conveyed towards the granulator 13, preferably under water, in order to be chopped thereat via the gear pump 18 which is connected to the granulator.

According to certain embodiments of the polymerisation process, the blender 15 may have various roles to perform various steps subsequent to the polymerization. Thus, the blender 15 may be used to concentrate the reaction medium by removing, where appropriate, part of the solvent, and/or unreacted monomers. Reactions subsequent to the polymerisation may also be performed in this blender 15. These various steps may take place simultaneously in the blender 15.

In FIG. 2 illustrating an installation variant for one of these embodiments of the process, the blender 15 is equipped with a condensation loop which allows:
the condensation of the gases derived from the reactor 15 via a condenser 16, and
the return of all or part of the condensate into the blender 15.

This condensation loop also ensures control of the heat of the reactions operating in the blender 15 by the at least partial vaporization of the non-elastomeric constituents of the reaction medium.

According to an optional embodiment, not shown, the condensation loop may advantageously be connected to a device for removing the uncondensable products in a manner that is known per se.

According to the embodiment of the invention illustrated in FIG. 2, a stopper and an antioxidant are then injected into the stream of the elastomer paste 17 discharged from the blender 15, by means, respectively, of feed sources 11 and 12 upstream of the gear pump 18.

The installation illustrated in FIG. 2 also comprises a granulator 13, preferably under water. The granulator 13 is equipped with an inlet connected to the gear pump 18 via which the discharge device feeds the granulator 13 with elastomer paste to be chopped. The granulator 13 is also equipped with an outlet adapted to remove from the said granulator 13, continuously, the particles of elastomer paste as a stream 14, especially towards a device for removing the solvent and the monomer(s).

FIGS. 1 and 2 are schemes of embodiments of the invention for the continuous synthesis of a diene elastomer via coordination catalysis. A person skilled in the art will understand that an installation for performing a process for the continuous synthesis of a diene elastomer via anionic polymerisation, which constitutes other embodiments of the invention, does not comprise a source for feeding with alkylating agent 7. According to this embodiment, the polymerisation reactor is connected, respectively, to several feed sources including at least one source for feeding with polymerisation initiator which then replaces the feed source referenced 2 in FIGS. 1 and 2.

Example 1

Process for Synthesizing a Polyisoprene Via Coordination Catalysis in Highly Concentrated Medium According to One Variant of the Invention A few definitions:
diethylaluminium chloride=DEAC
diisobutylaluminium hydride=DiBaH The polymerisation process was performed on a continuous line in the installation represented in FIG. 1 comprising a gas-phase reactor 150 liters in total with twin Z-shaped arms, equipped with a discharge device with an emptying screw and a gear pump.

Isoprene and pentane are mixed in a dynamic mixer 4 provided for this purpose upstream of the polymerisation reactor 1. The mixture obtained is injected in the form of a stream entering 3 directly into the reactor 1.

The isoprene is injected at a rate of 7.52 kg/h as a stream 5 into the mixer 4.

The pentane is injected at a rate of 12.40 kg/h as a stream 6 into the mixer 4, i.e. about 37% by mass of monomer in the reaction medium.

A coordination catalytic system is also injected directly into the reactor 1 as a stream 2. The catalytic system is based on neodymium tris[bis(2-ethylhexyl)phosphate], butadiene as preformation monomer, DiBaH as alkylating agent and DEAC as halogen donor. It was prepared according to the preparation method described in paragraph I of the above-mentioned document WO-A-03/097 708 in the name of the Applicants.

The catalytic system has the following mole ratios relative to the neodymium:
Nd/butadiene/DiBaH/DEAC=1/30/1.8/2.6

The amount of neodymium is 105 µmol per 100 g of isoprene. The mole concentration of neodymium in the catalyst is 0.02 mol/L.

DiBaH is also injected directly into the reactor 1 as a separate and independent stream 7. The amount of DiBaH injected is 110 µmol/100 g of isoprene. The mole concentration of the DiBaH solution is 0.1 mol/L.

The pressure of the gas phase is regulated at 0.16 barg, the vapours are condensed in an external condenser 8 and returned into the polymerisation reactor 1 with twin Z-shaped arms.

The jacket temperature is maintained at 35° C.

The mean residence time $t_0$ of the reaction is 80 minutes.

The discharge screw makes it possible to transfer the product from the reactor 1 to a gear pump 10.

The stopper and the antioxidant used are oleic acid, at 1 phr (phr: parts by mass per 100 parts by mass of elastomers) and N-1,3-dimethylbutyl-N'-phenyl-para-phenylenediamine, at 0.5 pcm (pcm: parts by mass per 100 parts by mass of isoprene monomer). This stopper and this antioxidant are injected one after the other at the outlet of reactor 1, upstream of the gear pump 10, as streams 11 and 12.

The gear pump 10 transfers the elastomer paste to the underwater granulator 13. The flow rate transferred by the gear pump 10 is equal to the sum of the flow rates injected into the reactor 1 to which is added the flow rates of stopper and of antioxidant.

No expansion phenomenon is observed.

The conversion measured on a withdrawn sample, at the limit of the first third of the reactor volume, is 89%. The conversion measurement was established from a GC measurement of the isoprene in the withdrawn sample. The residual isoprene in the withdrawn sample was assayed at 4% by mass.

Figure 3:
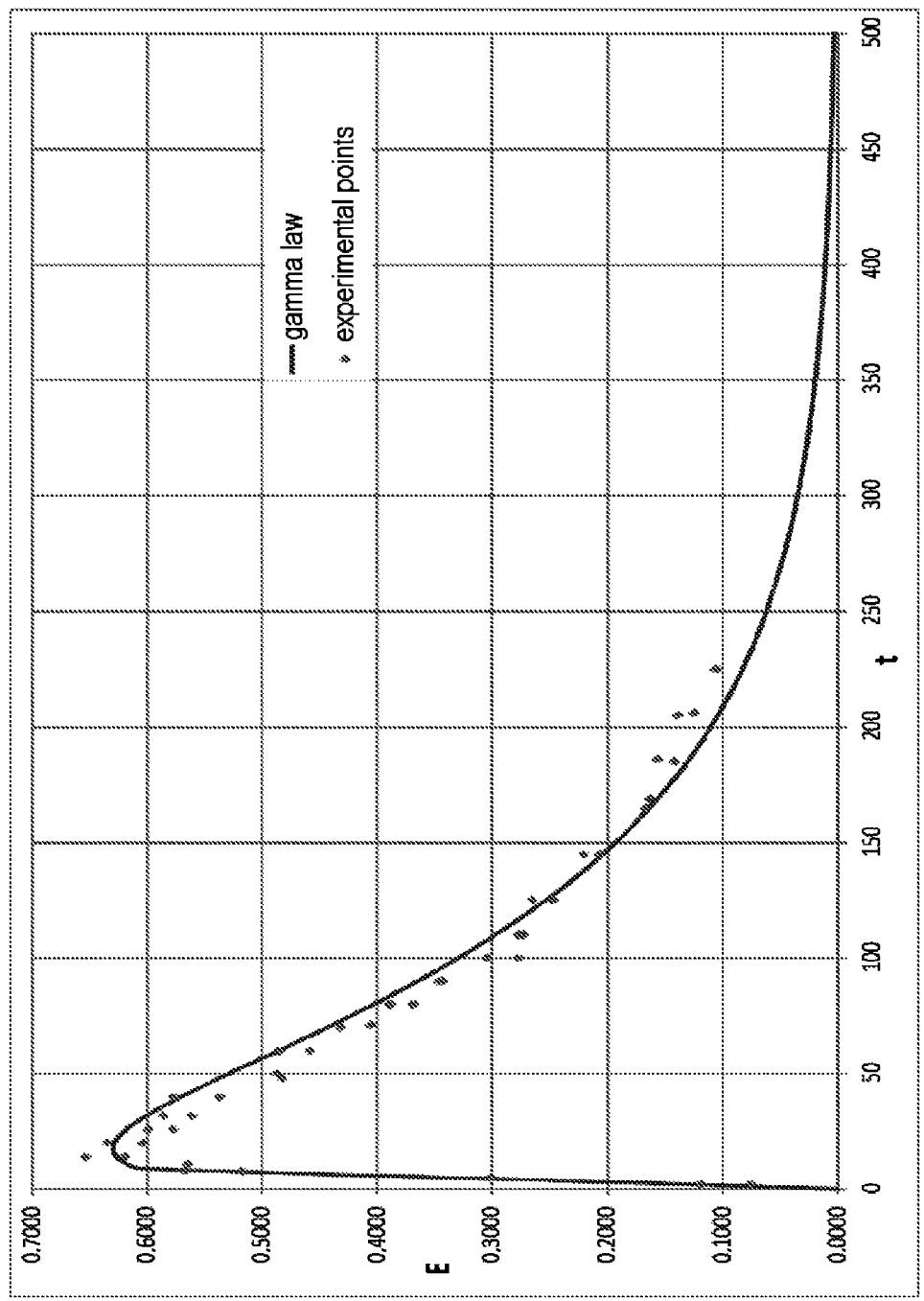
FIG. 3 is a graph showing a residence time distribution according to an embodiment of the invention.

The flows are characterized by the residence time distribution given in FIG. 3.

The experimental points for establishing this residence time distribution were obtained by gas chromatographic measurement of the changes in concentration of a tracer following a very rapid injection according to a method of pulse introduction of a chemically inert product according to the principle described in the book by *Jacques Villermaux, Génie de la reaction chimique: conception et fonctionnement des réacteurs. Editors.* 1993, TEC & DOC—LAVOISIER, pages 170 to 172. The experimental points are derived from samples taken from stream 9 of FIG. 1 at the outlet of reactor 1, at the end of the discharge screw.

Modelling of these experimental points by a gamma law made it possible to determine the variance of the residence time distribution function E.

The gamma law for modelling the residence time distribution function E is as follows:

$$E = \frac{t^{k-1} * e^{\frac{-t}{t_0}}}{\Gamma(k) t_0^k}$$

with:
$\Gamma(k)$: gamma function of k;
k: constant;
$t_0$: mean residence time, i.e. 80 minutes;
t: residence time.

The variance of this residence time distribution function is equal to $k*t_0^2$.

Adjustment of the function to the experimental points makes it possible to determine the parameter k, which is equal to 1.22.

The standard deviation of the residence time distribution function is deduced therefrom, which is equal to 88.4, which is greater than the mean residence time divided by $2\sqrt{3}$, i.e.

$$\frac{t_0}{2\sqrt{3}} = \frac{80}{2\sqrt{3}} = 23.1.$$

This polyisoprene synthetic process according to an embodiment of the invention, in highly concentrated medium and continuously, shows that if the combination of the established conditions of the process according to an embodiment of the invention, namely a minimum conversion of 60% and a standard deviation of the residence time distribution function in the polymerisation reactor greater than the mean residence time divided by $2\sqrt{3}$, is respected, no expansion phenomenon is observed. This process in accordance with the invention provides a solution to the technical problem of providing a flexible process, especially over a wide temperature range, that is adaptable to an economically advantageous industrial production due to the reduced amount of solvent used, while at the same time ensuring an increased production efficiency.

Example 2

Process for Synthesizing a Polyisoprene by Coordination Catalysis in Highly Concentrated Medium According to Another Variant of the Invention The polymerisation proceeds in the same manner as in Example 1. The reagents and the amounts injected into reactor 1 are the same. The stopper and the antioxidant are no longer injected at the outlet of reactor 1.

The gear pump 10 transfers the elastomer paste to a self-cleaning blender with a gas phase 15. The flow rate transferred by the gear pump 10 is equal to the sum of the flow rates injected into reactor 1.

The self-cleaning blender is a twin-arm blender-reactor with a total volume of 39 liters, with a discharge device consisting of an emptying twin screw and a gear pump 18. The flow in this twin-arm mixer-reactor may be likened to a piston flow.

The pressure of the gas phase is set at 0.16 barg relative, and the vapours are condensed in an external condenser 16 and conveyed to the self-cleaning blender 15.

The jacket temperature is maintained at 35° C.

The mean residence time $t_0$ of the reaction in the self-cleaning blender 15 is 37 minutes.

The stopper and the antioxidant used are oleic acid, at 1 phr (phr: parts by mass per 100 parts by mass of elastomers) and N-1,3-dimethylbutyl-N'-phenyl-para-phenylenediamine, at 0.5 pcm (pcm: parts by mass per 100 parts by mass of isoprene monomer). This stopper and this antioxidant are injected one after the other at the outlet of reactor 15, upstream of the gear pump 18, as flows 11 and 12.

The gear pump 18 transfers the elastomer paste to the underwater granulator 13. The flow rate transferred by the gear pump 18 is equal to the sum of the flow rates injected into reactor 1, to which is added the flow rates of the streams of stopper 11 and of antioxidant 12.

No expansion phenomenon is observed.

The conversion measured on a sample taken from stream 17 upstream of the gear pump 18 is 99.98%. The conversion measurement was established from a GC measurement of the isoprene in the sample taken. The residual isoprene in the sample taken was assayed at 74 ppm.

This polyisoprene synthetic process according to an embodiment of the invention, in highly concentrated medium and continuously, shows that if the combination of established conditions of the process according to an embodiment of the invention, namely a minimum conversion of 60% and a standard deviation of the residence time distribution function in the polymerisation reactor greater than the mean residence time divided by $2\sqrt{3}$, is respected, no expansion phenomenon is observed. This process in accordance with the invention provides a solution to the technical problem of providing a flexible process, especially over a wide temperature range, that is adaptable to an economically advantageous industrial production due to the reduced amount of solvent used, while at the same time ensuring increased production efficiency, without expansion of the reaction medium. This process also makes it possible to increase the degree of conversion up to 99.98%.

Example 3

Process for Synthesizing a Polyisoprene by Coordination Catalysis in Highly Concentrated Medium not in Accordance with the Invention The polymerisation process was performed on a continuous line in the installation comprising a stirred and self-cleaning reactor of continuous blender technology, with a gas phase and twin arms, with a total volume of 29 liters, equipped with a discharge device consisting of a twin screw and a gear pump. The speed of the arms is 20 rpm.

Isoprene and pentane are mixed in a dynamic mixer provided for this purpose upstream of the polymerisation reactor. The mixture obtained is injected in the form of a stream entering directly into the polymerisation reactor.

The isoprene is injected at a flow rate of 3.63 kg/h into the dynamic mixer.

The pentane is injected at a flow rate of 4.47 kg/h into the dynamic mixer, i.e. about 42% by mass of monomer in the reaction medium.

A coordination catalytic system is also injected directly into the polymerisation reactor. The catalytic system is based on neodymium tris[bis(2-ethylhexyl)phosphate], butadiene as preformation monomer, DiBaH as alkylating agent and DEAC as halogen donor. It was prepared according to the preparation method described in paragraph I of the abovementioned document WO-A-03/097 708 in the name of the Applicants.

The catalytic system has the following mole ratios relative to the neodymium:

Nd/butadiene/DiBaH/DEAC=1/30/1.4/2.6

The amount of neodymium is 350 µmol per 100 g of isoprene. The mole concentration of neodymium in the catalyst is 0.02 mol/L.

DiBaH is also injected directly into reactor 1 as a separate and independent stream 7. The amount of DiBaH injected is 50 µmol/100 g of isoprene. The mole concentration of the DiBaH solution is 0.01 mol/L.

The pressure of the gas phase is set at 0.5 barg, and the vapours are condensed in an external condenser and conveyed to the polymerisation reactor.

The jacket temperature is maintained at 48° C.

The mean residence time $t_0$ of the reaction is 54 minutes.

The discharge twin screw makes it possible to transfer the product from the reactor to a gear pump.

The stopper and the antioxidant used are oleic acid, at 1 phr (phr: parts by mass per 100 parts by mass of elastomers) and N-1,3-dimethylbutyl-N'-phenyl-para-phenylenediamine, at 0.5 pcm (pcm: parts by mass per 100 parts by mass of isoprene monomer). This stopper and this antioxidant are injected one after the other at the reactor outlet, upstream of the gear pump.

The gear pump transfers the elastomer paste to an underwater granulator. The flow rate transferred by the gear pump is equal to the sum of the flow rates injected into polymerisation reactor, to which is added the flow rates of stopper and of antioxidant.

During this test, expansion of the reaction medium was observed. This expansion did not make it possible to control the heat of the reaction.

The conversion measured on a sample taken, at the limit of the first third of the reactor volume, is 56%, i.e. less than the minimum limit required for the process of the invention. The conversion measurement is established from a GC measurement of the isoprene in the sample taken. The residual isoprene, in the sample taken, is assayed at 18% by mass.

Figure 4:
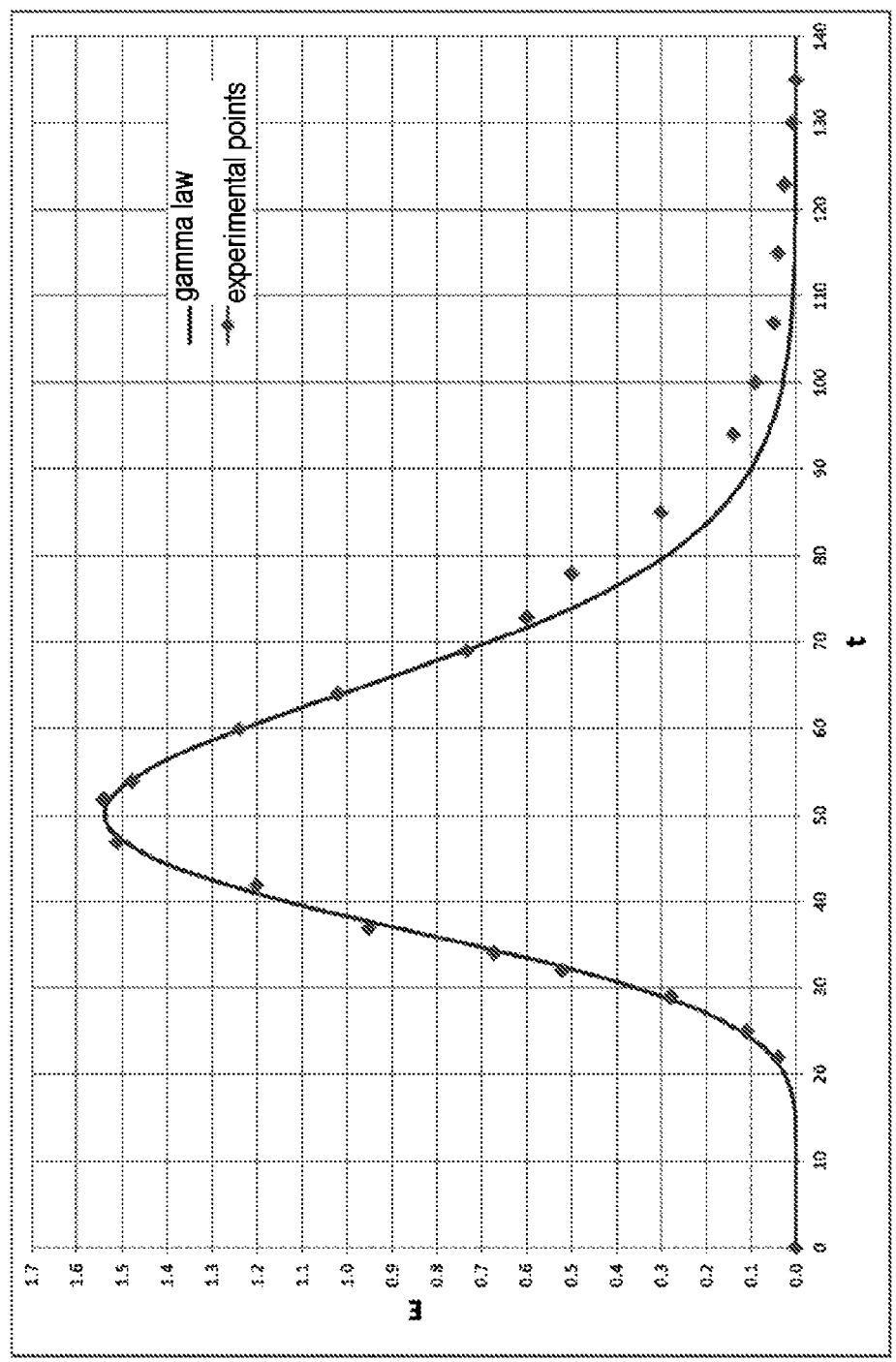
FIG. 4 is a graph showing a residence time distribution according to another embodiment of the invention.

The flows are characterized by the residence time distribution given in FIG. 4.

The experimental points for establishing this residence time distribution were obtained by gas chromatographic measurement of the changes in concentration of a tracer following a very rapid injection according to a method of pulse introduction of a chemically inert product according to the principle described in the book by *Jacques Villermaux, Génie de la réaction chimique: conception et fonctionnement des reacteurs*. Editors. 1993, TEC & DOC—LAVOISIER, pages 170 to 172. The experimental points are derived from samples taken at the polymerisation reactor outlet, at the end of the discharge screw.

Modelling of these experimental points by a gamma law made it possible to determine the variance of the residence time distribution function E.

The gamma law used for modelling the residence time distribution function E is the following:

$$E = \left(\frac{J}{t_0}\right)^J \frac{t^{J-1} * e^{\frac{-Jt}{t_0}}}{(J-1)!}$$

with:
J: number of reactors in series;
$t_0$: mean residence time, i.e. 54 minutes;
t: residence time.

The variance of this residence time distribution function is equal to $$\frac{t_0^2}{J}.$$

Adjustment of the function to the experimental points makes it possible to determine the parameter J, which is equal to 14.

The standard deviation of the residence time distribution function is deduced therefrom, which is equal to 14.43, which is less than the mean residence time divided by $2\sqrt{3}$, i.e.

$$\frac{t_0}{2\sqrt{3}} = \frac{54}{2\sqrt{3}} = 15.59,$$

which is the minimum limit required for the process of the invention.

This process not in accordance with an embodiment of the invention, for the synthesis of polyisoprene in highly concentrated medium and continuously, shows that if the combination of the established conditions of the process according to an embodiment of the invention, namely a minimum conversion of 60% and a standard deviation of the residence time distribution function in the polymerisation reactor greater than the mean residence time divided by $2\sqrt{3}$, is not respected, an expansion phenomenon is observed, which no longer makes it possible to control the heat of the reaction. This process not in accordance with the invention does not provide a solution to the technical problem of providing a flexible process, especially within a wide temperature range, which is adaptable to an economically advantageous industrial production while at the same time ensuring increased production efficiency.

APPENDIX 1

The inherent viscosity is determined by measuring the flow time (t) of the polymer solution and the flow time of toluene ($t_0$), in a capillary tube. The flow time of toluene and that of the polymer solution (C) at 0.1 g/dl are measured in an Ubbelhode tube (capillary diameter 0.46 mm, volume 18 to 22 ml), placed in a bath thermostatically maintained at 25±0.1° C.

The inherent viscosity is obtained by the following relationship:

$$\eta_{inh} = \frac{1}{C} \ln\left[\frac{(t)}{(t_0)}\right]$$

with:
C: polymer concentration of the toluene solution in g/dl;

t: flow time of the toluene solution of polymer in seconds;
$t_0$: flow time of the toluene in seconds;
$\eta_{inh}$: inherent viscosity expressed in dl/g.

The invention claimed is:

1. A process for the continuous synthesis of a diene elastomer, comprising, simultaneously:
    a) introducing continuously into a polymerisation reactor containing a gas phase and equipped with at least one stirring rotor and a discharge device, at least
        i. one or more monomer(s) to be polymerised, including at least one conjugated diene monomer, and
        ii. from 0% to 70% by mass of an organic solvent, calculated relative to the total mass of monomer(s) and of solvent
    b) continuously polymerising the monomer(s),
    c) stirring a polymerisation medium via the continuous movement of at least one stirring rotor about a rotary axle,
    d) continuously discharging an elastomer paste derived from the polymerisation,
    e) continuously conveying the discharged elastomer paste to a chopping device and chopping it into particles,
    f) removing the solvent from the particles of the elastomer paste and
    g) recovering the diene elastomer of the particles obtained in the preceding step; wherein
        (1) the process has a degree of conversion of at least 60%, at the limit of the first third of the reaction volume of the polymerisation reactor, and
        (2) the process has a residence time distribution function in the polymerisation reactor having a standard deviation that is greater than the mean residence time divided by $2\sqrt{3}$.

2. The process for the continuous synthesis of a diene elastomer according to claim 1, wherein the degree of conversion is at least 80%, at the limit of the first third of the reaction volume of the polymerisation reactor.

3. The process for the continuous synthesis of a diene elastomer according to claim 1, wherein the standard deviation of the residence time distribution function in the polymerisation reactor is greater than the mean residence time divided by 2.

4. The process according to claim 1, wherein the stirring of the polymerisation medium is performed by the continuous movement of two stirring rotors.

5. The process according to claim 4, wherein the blades are blades of sigma type or Z-shaped blades.

6. The process according to claim 1, wherein, in step e), the elastomer paste discharged is conveyed to a granulator for chopping said elastomer paste.

7. The process according to claim 6 wherein the granulator is an underwater granulator.

8. The process according to claim 1, further comprising, after step d) and before step e), $d_1$) continuously transferring the elastomer paste discharged from the polymerisation reactor to a blender containing a gas phase, a stirring device with at least one stirring rotor and a discharge device, $d_2$) additionally treating a physical nature, chemical nature, or both, of the said elastomer paste in the blender, and $d_3$) continuously discharging the elastomer paste derived from the additional treatment step.

9. The process according to claim 8, wherein the stirring device of the blender sweeps at least 90% of the volume of the blender, ensuring self-cleaning.

10. The process according to claim 8, wherein the additional treatment comprises concentration of the reaction medium.

11. The process according to claim 8, wherein the additional treatment comprises a reaction subsequent to the polymerisation.

12. The process according to claim 8, wherein the discharge of the elastomer paste in step d) and, where appropriate, in step $d_3$) is performed via the combined action of at least one emptying screw and of a gear pump which constitutes the discharge device.

13. The process according to claim 1, wherein the heat of the polymerisation reaction and, where appropriate, of the treatment subsequent to the polymerisation is governed by the at least partial vaporization of the constituents of the non-polymeric phase of the reaction medium.

14. The process according to claim 13, wherein the gas phase resulting from the at least partial vaporization of the constituents of the non-polymeric phase of the reaction medium is extracted from the polymerisation reactor and, where appropriate, from the blender.

15. The process according to claim 14, wherein the gas phase resulting from the vaporization of the constituents of the non-polymeric phase of the reaction medium is extracted and condensed to be totally or partly recycled into the polymerisation reactor and/or, where appropriate, into the blender.

16. The process according to claim 1, wherein the polymerisation takes place by coordination catalysis in the presence of a catalytic system based on at least: (i) a rare-earth metal organic salt, (ii) an alkylating agent and, where appropriate, (iii) a halogen donor, and/or (iv) a preformation diene monomer.

17. The process according to claim 16, wherein, during step a, at least one alkylaluminium compound of formula $AlR_3$ or $HAlR_2$ wherein R represents an alkyl radical containing from 1 to 20 carbon atoms and H represents a hydrogen atom, which is identical to or different from that of the catalytic system, is introduced continuously into the polymerisation reactor, via a stream separate from that of the catalytic system.

18. The process according to claim 17, further comprising, prior to step a), placing the alkylaluminium compound, the solvent and the monomer to be polymerised in contact to form a mixture, which is introduced into the polymerisation reactor during step a).

19. The process according to claim 16, wherein the diene monomer to be polymerised is chosen from butadiene and isoprene, or a mixture thereof.

20. The process according to claim 1, wherein the polymerisation is of anionic type and takes place in the presence of an anionic polymerisation initiator chosen from organic compounds of an alkali metal, introduced continuously into the polymerisation reactor during step a).

21. The process according to claim 20, wherein, in step a), the mixture of monomers i) also comprises at least one vinylaromatic monomer.

* * * * *